United States Patent
Stevens

(10) Patent No.: US 7,818,260 B2
(45) Date of Patent: Oct. 19, 2010

(54) SYSTEM AND METHOD OF MANAGING DIGITAL RIGHTS

(75) Inventor: Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1154 days.

(21) Appl. No.: 11/248,970

(22) Filed: Oct. 12, 2005

(65) Prior Publication Data

US 2007/0083475 A1 Apr. 12, 2007

(51) Int. Cl.
*G06F 21/00* (2006.01)
*H04K 1/00* (2006.01)
*H04L 9/00* (2006.01)

(52) U.S. Cl. .......................................... 705/59; 705/52
(58) Field of Classification Search ........................ None
See application file for complete search history.

(56) References Cited

U.S. PATENT DOCUMENTS

| 6,381,747 | B1 * | 4/2002 | Wonfor et al. ............... 725/104 |
| 7,371,959 | B2 * | 5/2008 | Hiratsuka .................... 84/645 |
| 2002/0083006 | A1 * | 6/2002 | Headings et al. ............. 705/59 |
| 2002/0143565 | A1 * | 10/2002 | Headings et al. .............. 705/1 |
| 2003/0200313 | A1 * | 10/2003 | Peterka et al. ............. 709/225 |
| 2004/0024688 | A1 * | 2/2004 | Bi et al. ........................ 705/37 |
| 2004/0054923 | A1 * | 3/2004 | Seago et al. ................ 713/201 |
| 2004/0123125 | A1 * | 6/2004 | Zuili .......................... 713/193 |
| 2004/0128499 | A1 * | 7/2004 | Peterka et al. ............. 713/155 |
| 2005/0063541 | A1 * | 3/2005 | Candelore ................... 380/239 |
| 2005/0071418 | A1 * | 3/2005 | Kjellberg et al. ............ 709/200 |
| 2005/0182931 | A1 * | 8/2005 | Robert et al. ............... 713/168 |
| 2006/0123485 | A1 * | 6/2006 | Williams ..................... 726/27 |
| 2006/0143133 | A1 * | 6/2006 | Medvinsky .................. 705/59 |
| 2007/0124252 | A1 * | 5/2007 | Higashi et al. ................ 705/59 |

* cited by examiner

*Primary Examiner*—Andrew J. Fischer
*Assistant Examiner*—C. Aaron McIntyre
(74) *Attorney, Agent, or Firm*—Brooks Kushman P.C.

(57) ABSTRACT

A system for managing subscriber access to content. The system may include a number of access points through which the subscribers access the content, a digital rights feature located remotely from the access points for storing digital rights of the subscribers to the content. Optionally, the digital rights feature is configured to control access to the content by the access points as function of digital rights individually associated with the subscribers.

30 Claims, 2 Drawing Sheets

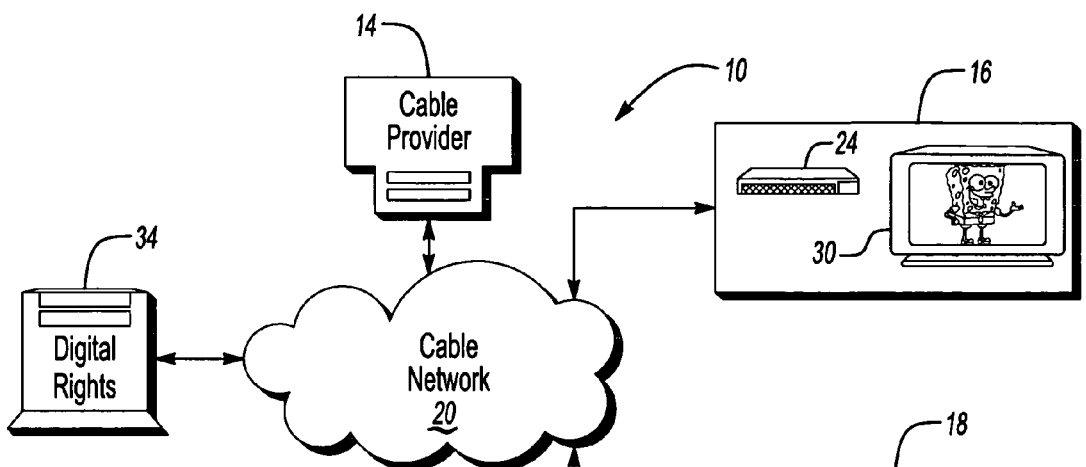
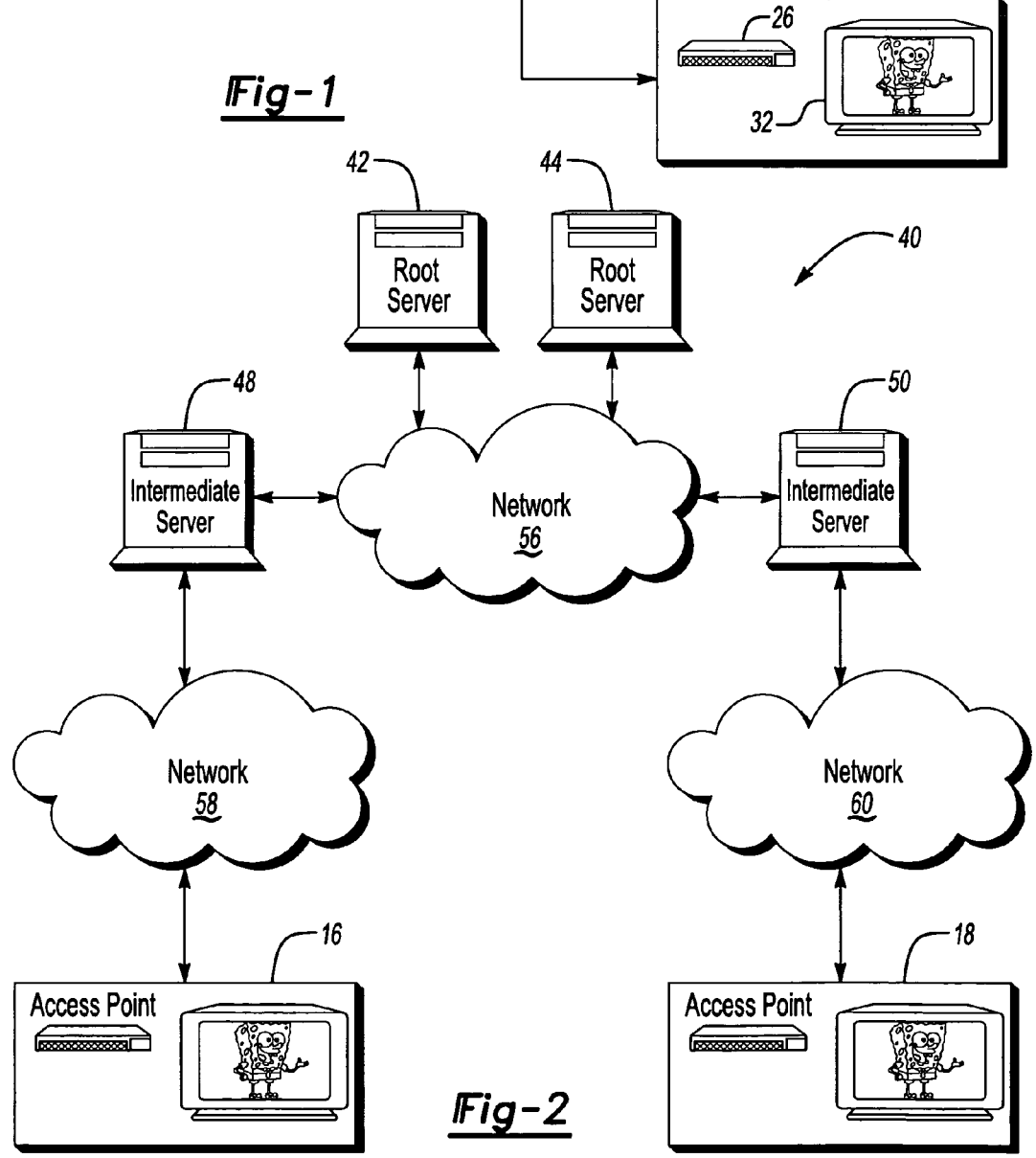

SYSTEM AND METHOD OF MANAGING DIGITAL RIGHTS

BACKGROUND OF THE INVENTION

1. Field of the Invention

The present invention relates to systems and methods of managing digital rights.

2. Background Art

Digital rights are rights generally associated with electronic media and protections provided to govern the usage thereof. In the past, the digital rights have been associated with the electronic media, and in some cases, tied to a physical embodiment of the media (CD, DVD, downloaded version, etc.). This arrangement makes legal migration between formats cumbersome and fails to protect the purchaser from loss of the physical embodiment.

SUMMARY OF THE INVENTION

One non-limiting aspect of the present invention relates to a system for managing subscriber access to content. The system may include a number of access points through which the subscribers access the content, a digital rights feature located remotely from the access points for storing digital rights of the subscribers to the content. Optionally, the digital rights feature is configured to control access to the content by the access points as function of digital rights individually associated with the subscribers.

Optionally, digital rights feature may be configured to facilitate platform-independent use of the content, which may include translating the content from a first format or protocol to a second, different format or protocol associated with the access point, and/or providing instructions for configuring the access point to access the content.

One non-limiting aspect of the present invention relates to a cable television system for managing digital rights. The system may include a cable provider configured for providing cable services to a number of subscribers, a number of access points associated with the subscribers and configured for interface the cable services with the subscribers, and a digital rights feature located remotely from the access points and configured to control subscriber access to the services as a function of subscriber digital rights thereto.

One non-limiting aspect of the present invention relates to a method of managing subscriber access to content. The method may include associating the subscribers with digital rights to the content, storing the digital rights remotely from the content, identifying subscribers attempting to access the content, determining whether the identified subscribers include digital rights to the content, and limiting access of the identified subscribes according to the remotely located digital rights.

One non-limiting aspect of the present invention relates to a scalable distributed system for recording and managing rights to digital content associated with individual subscribers in which an authentication chain is maintained back to one or more authorized authentication servers. The system may include a root server configured to store a master copy of the associated rights and a chain of intermediate servers located downstream from the root server and configured to store the associated rights such that the rights are retrievable on demand from digital rights requests from downstream devices if the digital rights of the subscriber associated therewith are evident on the server.

Optionally, the intermediate digital rights servers may request updates from upstream digital rights servers if the digital rights of the subscriber associated with the requesting downstream device are not evident on the server such that requests continue upstream until one of the intermediate servers in the authentication chain either discovers the requested rights or the root server determines that such rights do not exist and communicates this fact back downstream to the requesting device.

One non-limiting aspect of the present invention relates to a system for managing subscriber access to content. The system includes: a digital rights feature programmed to manage digital rights to purchased media content, the digital rights feature programmed to generate a single, unique key for each purchase, the key being required to playback the purchased media content; a digital rights server programmed to receive a message for each purchase, prior to first playback of each purchase, that identifies: (i) the purchased content; (ii) the unique key required to playback the purchased content; and (iii) identification of a purchaser; wherein the digital rights server is programmed to, upon receipt of a request to transmit the key associated with the purchased media content, identify the purchaser making the request and to transmits the unique key to the identified purchaser to permit playback, the digital rights server programmed to transmit different, unique keys for the same media content in the event the same media content is desired for playback by different purchasers; wherein the digital rights server is programmed to identify a primary playback device for each purchaser from the message, the primary playback device storing a full length copy of the media content on an included memory; wherein the digital rights server is programmed to transmit instructions to the primary playback device and to instruct delivery of the purchased media content from the memory of the primary playback device to a secondary playback device upon receipt of a request from the purchaser to playback the purchased media content on the secondary playback device; wherein the digital rights server is programmed to transmit the unique key to the secondary playback device for the purchased media content to be transferred from the primary playback device to the second playback device in order to permit playback at the second playback device; wherein the unique key is included on discs used to store multiple copies of the same media content, each disc being individually purchased and used by the primary playback device to copy the purchased media to the memory; wherein the primary playback device is programmed to permanently transmit the unique key included on the disc to the digital rights server, the permanent transmission being characterized by an inability of the primary playback device to subsequently transmit the unique key to the digital rights server; and wherein the primary playback device is programmed to permanently transmit the unique key included on the disc to the digital rights server, the permanent transmission being characterized by an inability of the primary playback device to subsequently transmit the unique key to the digital rights server.

In accordance with one non-limiting aspect of the present invention, the primary playback device is an electronic device that transmits the message from each purchaser of the purchased media content to the digital rights server prior to first playback.

In accordance with one non-limiting aspect of the present invention, the digital rights server is programmed to instruct the primary playback device to transmit the purchased media content to the digital rights server and not directly to the secondary playback device, wherein the digital rights server is programmed to then transmit the purchased media content to the secondary playback device.

In accordance with one non-limiting aspect of the present invention, the digital rights server is programmed to only temporarily buffer the purchased media content for a period of time sufficient to support transmission to the secondary playback device.

In accordance with one non-limiting aspect of the present invention, the digital rights server is programmed to convert the purchased media content from a first format used by the primary playback device to a second format used by the secondary playback device.

In accordance with one non-limiting aspect of the present invention, the digital rights server is programmed to assign the unique key to the media content prior to purchase, thereby requiring a plurality of the unique keys to be associated with the same media content prior to purchase.

In accordance with one non-limiting aspect of the present invention, the primary playback device is programmed to transmit the unique key to the digital rights server prior to first playback of the purchased media content on the primary playback device.

One non-limiting aspect of the present invention relates to a system for managing subscriber access to purchased media content. The system includes: a digital rights server programmed to cross-reference each piece of purchased media content with an individually and uniquely assigned key, each key being assigned to only one piece of media content available for purchase and being required to playback the associated media content; a digital rights application being embedded within each piece of media content available for purchase, the digital rights application being programmed to have the only copy of the key assigned to the associated media content and being programmed to automatically transmit the key to the digital rights server for cross-referencing as part of an authentication process executed after purchase of the media content; a first machine programmed to playback the media content using the assigned key; wherein the digital rights server is programmed to transmit the unique key to a second machine device in order to permit playback of the purchased media content at the second machine; and wherein the digital rights application is programmed to force the first machine to permanently transmit the key to the digital rights server, the permanent transmission being characterized by an inability of the first machine to subsequently transmit the unique key to the digital rights server.

In accordance with one non-limiting aspect of the present invention, the first machine is programmed to execute the digital rights application after purchase of the media content, the digital rights application forcing the first machine to permanently transfer the key to the digital rights server prior to first playback.

In accordance with one non-limiting aspect of the present invention, the media content is purchased on a disc and loaded for playback and execution of the digital rights application by the first machine.

In accordance with one non-limiting aspect of the present invention, the first machine is programmed to download the purchased media content from a website prior to first playback, wherein the website permanently transfers the key to the digital rights server prior to download to the first machine, the permanent transfer being characterized by an inability of the first machine to subsequently transmit the key to the digital rights server.

In accordance with one non-limiting aspect of the present invention, the digital rights server creates a cross-reference entry in a lookup table used to cross-reference the keys with the purchased media content only after the media content is purchased.

One non-limiting aspect of the present invention relates to a method for managing subscriber access to media content. The method includes: associating a unique key to each piece of media content, the unique key being required by a playback device in order to playback the associated piece of media content; embedding the unique key with the associated piece of media content, the embedded unique key traveling with the corresponding piece of media content; after purchase of a piece of the media content, receiving the unique key with a server, the server being in electronic communication with a first playback device initially used to playback the purchased piece of the media content, the first playback device being forced to permanently transmit the unique key to the server, the permanent transmission being characterized by an inability of the first playback device to subsequently transmit the unit key; and upon receipt of a request to playback the purchased piece of media content on a second playback device, transmitting the unique key from the server to the second playback device in order to permit playback of the purchased piece of media content at the second playback device.

In accordance with one non-limiting aspect of the present invention the method includes, the server transmitting instructions to the first playback device in order to force the first playback device to permanently transmit the unique key embedded on the purchased piece of the media content to the server.

In accordance with one non-limiting aspect of the present invention the method includes, the instructions requiring the first playback device to permanently transmit the unique key before a first playback of the purchase piece of the media content In accordance with one non-limiting aspect of the present invention the method includes, embedding the unique key on the purchased piece of the media content at a time of purchase.

In accordance with one non-limiting aspect of the present invention the method includes, embedding the unique key as a part of a download process used to download the purchased piece of the media content to the first playback device.

In accordance with one non-limiting aspect of the present invention the method includes, embedding the unique key on a disc used to store the purchased piece of the media content.

In accordance with one non-limiting aspect of the present invention the method includes, the server instructing the first playback device to remove the unique key from the disc after permanently transmitting the unique key to the server.

In accordance with one non-limiting aspect of the present invention the method includes, the server receiving the purchased piece of the media content from the first playback device and re-transmitting the received, purchased piece of the media content to the second playback device.

In accordance with one non-limiting aspect of the present invention the method includes, the server re-formatting the purchased piece of the media content prior to re-transmitting the purchased piece of the media content to the second playback device.

In accordance with one non-limiting aspect of the present invention the method includes, the server re-formatting the purchased piece of the media content from a first format required by the first playback device to a second format required by the second playback device, the second playback device being unable to playback the first format.

In accordance with one non-limiting aspect of the present invention the method includes, associating different, unique keys with each piece of the media content.

In accordance with one non-limiting aspect of the present invention the method includes, associating different, unique keys with each piece of the media content prior to purchase.

In accordance with one non-limiting aspect of the present invention the method includes, associating the unique key received by the server with a user.

In accordance with one non-limiting aspect of the present invention the method includes, limiting transmission of the unique key received by the server to the user associated therewith.

In accordance with one non-limiting aspect of the present invention the method includes, requiring the server to re-transmit the unique key each time the purchased piece of the media content is desired for playback.

In accordance with one non-limiting aspect of the present invention the method includes, limiting use of the unique key to only one of the first and second playback devices at the same time.

In accordance with one non-limiting aspect of the present invention the method includes, the server including digital right controls with the transmission of the unique key.

In accordance with one non-limiting aspect of the present invention the method includes, the digital rights controls limiting a total number of times the purchased piece of the media content can be played or a total number of copies that can be made of the purchased piece of the media content.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a system for managing digital rights in accordance with one non-limiting aspect of the present invention;

FIG. 2 illustrates a distributed digital rights system in accordance with one non-limiting aspect of the present invention.

DETAILED DESCRIPTION OF THE PREFERRED EMBODIMENT(S)

Figure 3:
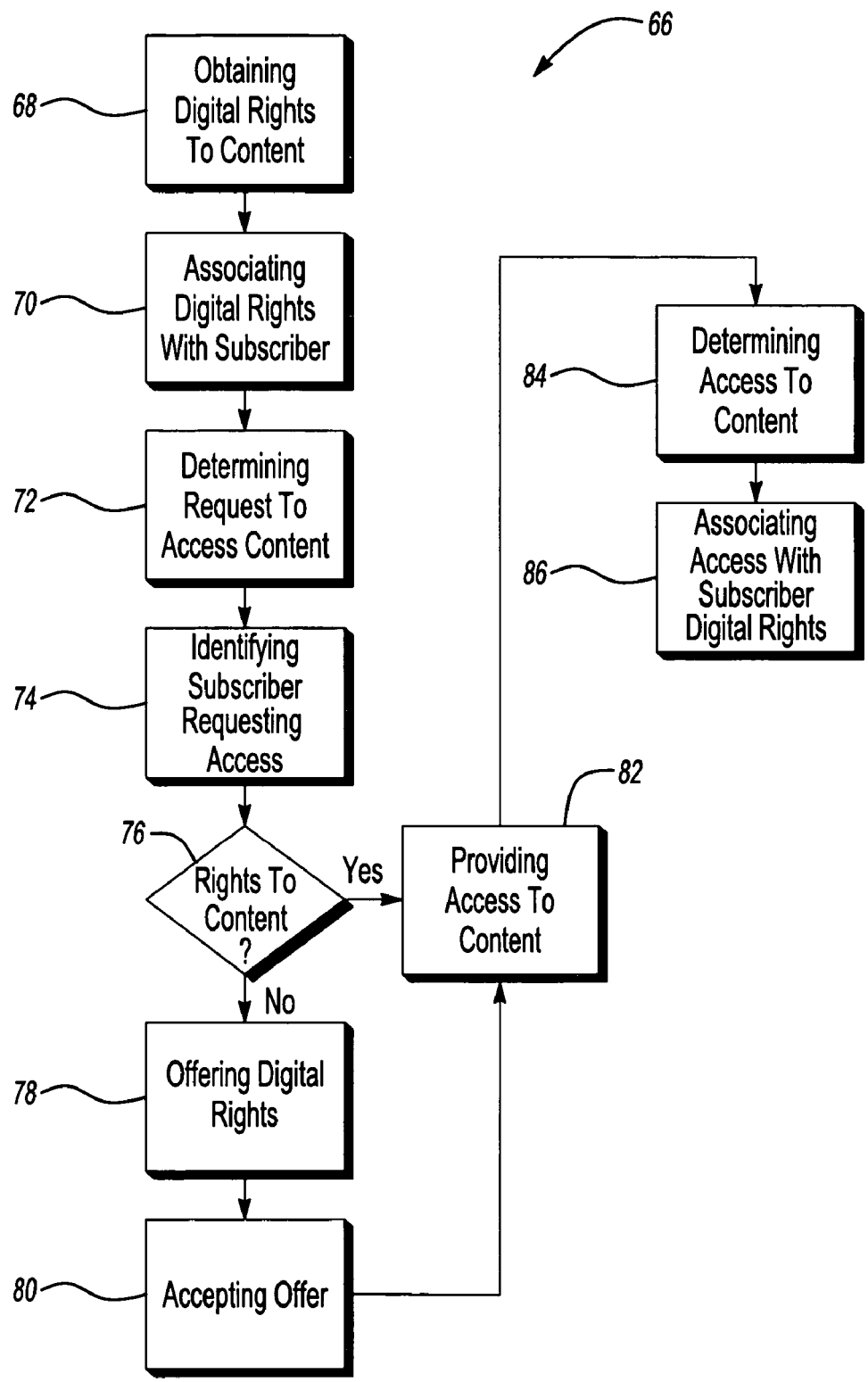
FIG. 3 illustrates a flowchart of a method of managing digital rights in accordance with one non-limiting aspect of the present invention.

FIG. 1 illustrates a system 10 for managing digital rights in accordance with one non-limiting aspect of the present invention. The system 10 is shown for exemplary purposes to be a cable television system where a cable provider 14 supports services for a number of subscribers at a number of access points 16-18. A wireline or wireless cable network 20 may be provided for supporting signal delivery between the cable provider 14 and the access points 16-18.

The access points 16-18 may relate to any device, medium, or feature used to access services associated with the cable provider 14. For exemplary purposes, the access points 16-18 include settop boxes (STBs) 24-26 and televisions 30-32. The STBs 24-26 may include applications and other features to facilitate interfacing signals between the cable provider 14 and the subscribers. The televisions 30-32 may display images and other information provided through the STBs 24-26, as one skilled in the art will appreciate.

The present invention is not intended to be limited to the foregoing and fully contemplates any number of other features being substituted for or used in addition to the cable provider 14, STBs 24-26, and/or televisions 30-32. In particular, the cable provider 14 may be associated with any provider or source of content, whether the content is associated with video, audio, data or applications related thereto. Likewise, the access points 16-18 may be associated with a webpage, portal, computer, media player, mobile telephone, personal digital assistant, or other user interfacing feature suitable or exchanging information between the provider and subscribers, with or without the assistance of a television or other output device.

The system 10 may further include a digital rights feature 34 for managing digital rights of the subscribers to content provided or registered through the system. The digital rights may relate to entitlements, purchases, subscriptions, and other rights of subscribers to access, play, copy, distribute, and perform other actions with respect to the content. The cable provider 14 or another entity associated therewith may provide or otherwise support the digital rights feature 34. The digital rights feature 34 may be configured to interface with other system features and elements through the network 20.

The digital rights feature 34 may include a processor and memory or other storage/database feature for associating subscribers with particular digital rights. For example, the digital rights feature 34 may be configured to keep track of subscriber purchases of particular content and rights associated with the use thereof. A lookup table or other feature may used to cross-reference or otherwise associate the subscribers with particular digital rights. Entries or other indices may be used to further associate the subscriber's digital rights with particular content.

The digital rights feature 34 may associate the digital rights directly with the subscriber, as opposed to with the content. The digital rights feature 34 may be used as an independent body for registering digital rights associated with the subscribers, regardless of whether the content is associated with the cable provider 14. In this manner, as described below in more detail, and amongst other benefits, the association of the digital rights with the subscribers, and not necessarily with the content, allows the subscribers to access copies of the content if the content is destroy, to access the content from hardware not associated with the original/purchased copy thereof, and to permit the content to be translated from one format/protocol to another without destroying the rights thereto.

In operation, if the subscriber purchases a movie on demand from the cable provider 14, for example, the digital rights feature 34 may receive instructions from the STB 16-18, a headend unit (not), or other feature associated with the provider for indicating the purchasing thereof. The instructions may further include attendant restrictions associated with the user thereof, such as limiting viewing to a period of 3 days after purchase. Likewise, if the subscriber downloads an audio file or other data from a webpage or other network feature, the digital rights feature 34 may receive instructions from the webpage facilitating the download indicating the purchasing thereof and attendant restrictions associated with the user thereof, such as restrictions on copying.

Optionally, the content may be purchased from features not in communication with the network 20, such as through direct file transfer and/or in-store purchases. The content, however, may be configured to include embedded features for forcing registration with the digital rights feature 34, such as by requiring a network connection in order to initially access the content through a login or other registration process and/or the embedded feature may require a password or other limit that the purchaser may only obtain by registering with the digital rights feature 34 through voice or data communications.

In this manner, the digital rights feature 34 may be standalone feature having network communication capabilities. The digital rights feature 34 may be associated with the provider and/or granted access to the cable network while being supported by a vendor or other non-cable entity. The digital rights feature 34 may be used to register digital rights for content purchased by the subscribers through the cable provider and/or digital rights otherwise registered with the digital rights feature 34 through other operations. Optionally, the digital rights feature 34 may be used to support subscribers who may not be subscribers of the cable provider 14, i.e., digital rights subscribers but not cable subscribers.

The association of the digital rights with the subscribers, rather than with the content, and the storage thereof with the digital rights feature 34 may be advantageous in enhancing security of the digital rights. The digital rights feature 34 may be located remotely form the content and the subscriber, and optionally at a secured location associated with provider 14 that is relatively inaccessible to the subscribers, such that it is difficult, if not impossible, for the subscriber to hack into or other otherwise gain access to the digital rights and adjust the entitlements and limitations specified therein.

The foregoing is provided for exemplary purposes and the present invention fully contemplates including more or less of the features. The present invention illustrates each of the features to be standalone items, however, the present invention fully contemplates any one or more of the features and/or the operations associated therewith being integrated into any one or more of the other features in the system.

FIG. 2 illustrates a distributed digital rights system 40 in accordance with one non-limiting aspect of the present invention. The system 40 describes in more detail one manner in which authorization, instructions, and other signals associated with the subscriber digital rights may be retrieved, accessed, or otherwise determined and/or communicated to the access points 16-18 for use in accessing desired content. The system 40 is provided for exemplary purposes and is not intended to limit the present invention to any particular configuration of coordinating digital rights information to the access points 16-18.

As described above, the digital rights feature 34 associates the subscribers with digital rights to particular content. Depending on system size and the number of supported subscribers, it may be advantageous to distribute the record keeping and other operations associated with managing the digital rights. A number of root servers 42-44 may be provided to share a portion of the record keeping and monitoring associated with the digital rights feature 34.

The root servers 42-44 may be central authorities or other entities associated with controlling the digitals and insuring the accuracy thereof. The root servers 42-44 may be master controls for some or all of the subscribers, at least with respect to deciding the digital rights associated therewith. A number of intermediate servers 48-50 may be included downstream of the root servers 42-44 to facilitate access to the digital rights specified in one or more of the root servers 42-44. A number of networks or network portions 56-60, from any number of geographic regions, may be included to facilitate communications between the servers 42-50 and access points 16-18.

The intermediate servers 48-50 may include the digital rights for subscribers having communications therewith. The intermediate servers 48-50 may be configured to receive digital rights requests from the access points 16-18, such as in response to one or more of the subscribers attempting to access content. The intermediate server 48-50 receiving the request may analyze it to identify the requesting subscriber and their associated digital rights. The server 48-50 may then interrogate the root servers 42-44 or one or more of the other intermediate servers 48-50 to determine the digital rights of the requesting subscriber.

The interrogated digital rights may be then be communicated downstream to the requesting access point 16-18 for controlling access or other authorization to the content. Optionally, each intermediate server 48-50 may be configured to cache or otherwise store each set of digital rights received from the root servers 42-44 over time. In this manner, if the subscriber has previously requested digital rights for the same content from the same intermediate server 48-50, the intermediate server 48-50 may provide the information associated therewith without having to interrogate one of the other servers 42-50, much like the commonly used domain name server (DNS) process.

The servers 42-50 may provide a chain of intermediate servers 48-50 located downstream from the root servers 42-44 such that the digital rights are retrievable on demand from digital rights requests made by the downstream devices 16-18 if the digital rights of the subscriber associated therewith are evident on the requested server 48-50. The intermediate digital rights servers 48-50 may be configured to request updates from the other digital rights servers 42-50 if the digital rights of the subscriber associated with the requesting downstream device 16-18 are not evident on the server 48-50. In this manner, requests continue upstream until one or the intermediate servers 48-50 in the authentication chain either discovers the requested rights or one of the root servers 42-44 determines that such rights do not exist and communicates this fact back downstream to the requesting device 16-18. Optionally, each server 42-50 in the chain may be configured to store the digital rights for subsequent access and usage.

FIG. 3 illustrates a flowchart 66 of a method of managing digital rights in accordance with one non-limiting aspect of the present invention. The method may be associated with the cable systems shown in FIGS. 1 and 2 or other non-cable applications where it is desirable to manage digital rights of a number of subscribers.

Block 68 relates to one or more of the subscribers obtaining digital rights to content. The digital rights may relate to rights to listen, playback, and optionally copy an audio file, movie, television program, or other video. The digital rights may be related to watching and recording programs, audio, and other features associated with a pay-per-view or other subscription based services, and any number of rights or entitlements to any type of content. The rights may be obtained through purchases, subscriptions, or other exchanges.

Block 70 relates to associating the digital rights with the subscribers. This may include communicating instructions to the digital rights feature 34 at the time of purchase of the digital rights. The instructions may be used to identify the subscribers and the digital rights associated therewith, such as through signaling from the provider 14 or signaling from the access point at the time of purchase or when access thereto is attempted. Likewise, the association may occur during a registration or login process attempted by the subscriber at some point after purchasing the content, such as when attempting to load or playback the purchased content or through an independent telephone or electronic registration process.

Optionally, the association of the digital rights with the subscriber may include associating limitations with the use of the content. This may include limiting a number of copies or recordings permitted of the content, limiting a period of time within which the content may be accessed, limiting locations from which the content may be accessed, and any other restraints or parameters associated with accessing the content. These restrictions may be specified in a purchase agreement associated with the content and delivered to the digital rights feature 34 upon the registration thereof and/or the limitations may be provided directly to the digital rights feature 34 by the vendors associated with the content or others responsible for the production thereof.

Block 72 relates to determining a request to access the content. The request may be received by the digital rights feature 34 through any number of interfaces. For example, if the content relates to an audio file purchased by the subscriber that the subscriber has transferred to a non-authorized media device for playback, the request may be received from the non-authorized media device, such as through messaging and other signals communications executed over the network 20 between the media device 16-18 and the digital rights feature 34.

Likewise, the request may be received through a video on demand guide, digital video recording (DVR), or other electronic programming guide provided through the STBs 24-26 and displayed on the televisions 30-32. For example, if the subscriber has purchased a movie channel subscription or video on demand, the subscriber may be entitled to view movies associated with particular movie channels or vendors and/or to view the purchased movie for a specified period of time.

Of course, the request to access content may be originate from any number access points 16-18 having any number of configurations for accessing the content. Optionally, the content may include embedded feature or indexes to other operations which require the device or feature attempting to access the content to communicate the desired instructions to the digital rights feature 34 and/or require the user to otherwise communicate the instructions to the digital rights feature 34, such as through messaging or voice communications executed through features independent of the device attempting to access the content.

Block 74 relates to identifying the subscriber requesting access to the content. This may include an exchange between the digital rights feature 34 and the access point 16-18 through which the content is attempting to be accessed. For example, the STBs 24-26 may include signals indicating the subscribers associated therewith and/or it may include features for permitting a subscriber to identify themselves on another STB 24-26 associated with a different subscriber, such as to support access to content from other subscriber STBs 24-26 through a login process or a personal identification number (PIN) security exchange.

Other procedures may similarly be used for identifying the subscriber requesting access to the content. A webpage login on or other portal may be provided by the digital rights feature 34 and/or provided to communicate with the digital rights feature 34 through which the subscribers may identifying themselves as the entity requesting access to the content. Optionally, the content may included embedded features and/or code that automatically presents a user interface other otherwise request the subscriber to identify themselves. The embedded feature may travel with the content and include instructions for delivering the identification information to the digital rights feature 34.

Optionally, the identification information may include other information beyond merely identifying the subscriber attempting to access the content. For example, the identification information may include information on the content being accessed and/or an ability of the access point to support access thereto. In more detail, the subscriber may be attempting to access content originally provided according to a first protocol or standard with a device having capabilities for only accessing the content through a second, non-related, protocol or standard, in which case the subscriber may need be provided with another copy of the content suitable to the capabilities of the accessing access point and/or provided with a program or other means for translating the original content to a format suitable for the accessing device.

Block 76 relates to determining whether the subscriber identified to be requesting access to the content has or is associated with digital rights thereto. This may include the digital rights feature 34 cross-reference the identified subscriber with their associated digital rights and then matching the digital rights to the requested content. The digital rights associated therewith may then be used to govern access to the requested content. A digital rights key or other information/authorization associated with permitting access to the content may be included with the digital rights and located while reviewing the subscriber's digital rights.

Block 78 relates to the subscriber failing to be associated with digital rights to the requested content and the provider and/or digital rights feature 34 offering to provided the digitals rights thereto. This may include providing an offer through an EPG supported by the STBs 24-26, such as through an impulse-pay-per view menu or other feature, that the subscriber may select to purchase or otherwise obtain the desired digital rights. Optionally, the subscriber may be directed to a webpage or other interface (messaging, voice system) through which digital rights to the content may be purchased.

Block 80 relates to the subscriber accepting the offer to purchase or otherwise obtain the desired digital rights. An entry on the digital rights feature 34 may be made for the subscriber if the subscriber is a new subscriber and/or the digital rights associated previously associated with the subscriber may be updated to reflect the newly purchased digital rights. A message or other indicator may be automatically triggered and delivered to the subscriber to confirm purchase of the digital rights. Optionally, the purchase confirmation may be made through the provider and addressed to the subscriber through information kept by the provider 14 so as to warn the subscriber of identification fraud or other unintentionally purchases made on the subscriber's account.

Block 82 relates to providing the subscriber access to the requested content. This may include the digital rights feature 34 and/or the provider transmitting and decryption key or other piece of information to the user access point 16-18. The key may be use by the user access point to permit playback and other access to the requested content, such as to permit viewing of a purchased movie or recorded program on a STB 24-26 not previously associated with the subscriber.

Optionally, the information provided to the access point 16-18 may operate in conjunction with embedded featured include within the content for restricting the access thereto. For example, usage limitations may be included within the key or other signal transmitted therewith to operate in conjunction with the embedded features to limit access to the content according to restrictions specified within the digital rights, such as to limit copying and transferring of the content from the access point 16-18.

The key or other information associated with providing access to the content may be transmitted to the access point 16-18 through the cable network 20 or through other operations. For example, the key may be transmitted through a voice or data message to the subscriber such that the subscriber must enter a password or other feature into the access point 16-18 to access the content and/or the key may be transmitted directly to the access point 16-18, such as through cable out-of-band (OOB) messaging or other similar operations.

In addition to providing information for permitting access to the content and limiting the use thereof, the digital rights feature 34 facilitate translating or otherwise distributing additional copies or versions of the content to permit the subscriber to access the content from access points 16-18 having non-affiliated capabilities, i.e., to provide platform-independent use of the content. In more detail, one advantage of the present invention is that it permits subscribers to access content through any number of media playback protocols and formats without losing the digital rights associated therewith. The digital rights feature 34 may be configured to translate the content from a first to a second format in order to permit access thereto and/or to provide the access point with a software program or other feature to facilitate access to the desired content.

Block 84 relates to determining actual access to the requested content. This may include the user access point communicating with the digital rights feature 34 and indicating successful access to the content. An embedded feature in the content may be configured to instruct the user access point to emit signals to the digital rights feature 34 and/or the provider 14 to indicate actual access to the content and other parameters associated with the used thereof.

Block 86 relates to associating the access with the digital rights of the associated subscriber. This may include the digital rights feature 34 noting the access and decrementing the use thereof for billing or other management purposes, such as to track user habits and/or to keep track of content usage restrictions, i.e., the subscriber may be limited to accessing the content for a limited period of time or for a limited number of usages.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for managing subscriber access to content, the system comprising:
   a digital rights feature programmed to manage digital rights to purchased media content, the digital rights feature programmed to generate a single, unique key for each purchase, the key being required to playback the purchased media content;
   a digital rights server programmed to receive a message for each purchase, prior to first playback of each purchase, that identifies:
   (i) the purchased content;
   (ii) the unique key required to playback the purchased content; and
   (iii) identification of a purchaser; and
   wherein the digital rights server is programmed to, upon receipt of a request to transmit the key associated with the purchased media content, identify the purchaser making the request and to transmit the unique key to the identified purchaser to permit playback, the digital rights server programmed to transmit different, unique keys for the same media content in the event the same media content is desired for playback by different purchasers;
   wherein the digital rights server is programmed to identify a primary playback device for each purchaser from the message, the primary playback device storing a full length copy of the media content on an included memory;
   wherein the digital rights server is programmed to transmit instructions to the primary playback device and to instruct delivery of the purchased media content from the memory of the primary playback device to a secondary playback device upon receipt of a request from the purchaser to playback the purchased media content on the secondary playback device;
   wherein the digital rights server is programmed to transmit the unique key to the secondary playback device for the purchased media content to be transferred from the primary playback device to the second playback device in order to permit playback at the second playback device;
   wherein the unique key is included on discs used to store multiple copies of the same media content, each disc being individually purchased and used by the primary playback device to copy the purchased media to the memory; and
   wherein the primary playback device is programmed to permanently transmit the unique key included on the disc to the digital rights server, the permanent transmission being characterized by an inability of the primary playback device to subsequently transmit the unique key to the digital rights server.

2. The system of claim 1 wherein the primary playback device is an electronic device that transmits the message from each purchaser of the purchased media content to the digital rights server prior to first playback.

3. The system of claim 1 wherein the digital rights server is programmed to instruct the primary playback device to transmit the purchased media content to the digital rights server and not directly to the secondary playback device, wherein the digital rights server is programmed to then transmit the purchased media content to the secondary playback device.

4. The system of claim 3 wherein the digital rights server is programmed to only temporarily buffer the purchased media content for a period of time sufficient to support transmission to the secondary playback device.

5. The system of claim 4 wherein the digital rights server is programmed to convert the purchased media content from a first format used by the primary playback device to a second format used by the secondary playback device.

6. The system of claim 1 wherein the digital rights server is programmed to assign the unique key to the media content prior to purchase, thereby requiring a plurality of the unique keys to be associated with the same media content prior to purchase.

7. The system of claim 1 wherein the primary playback device is programmed to transmit the unique key to the digital rights server prior to first playback of the purchased media content on the primary playback device.

8. A system for managing subscriber access to purchased media content, the system comprising:
- a digital rights server programmed to cross-reference each piece of purchased media content with an individually and uniquely assigned key, each key being assigned to only one piece of media content available for purchase and being required to playback the associated media content;
- a digital rights application being embedded within each piece of media content available for purchase, the digital rights application being programmed to have the only copy of the key assigned to the associated media content and being programmed to automatically transmit the key to the digital rights server for cross-referencing as part of an authentication process executed after purchase of the media content;
- a first machine programmed to playback the media content using the assigned key;
- wherein the digital rights server is programmed to transmit the unique key to a second machine device in order to permit playback of the purchased media content at the second machine;
- wherein the digital rights application is programmed to force the first machine to permanently transmit the key to the digital rights server, the permanent transmission being characterized by an inability of the first machine to subsequently transmit the unique key to the digital rights server.

9. The system of claim 8 wherein the first machine is programmed to execute the digital rights application after purchase of the media content, the digital rights application forcing the first machine to permanently transfer the key to the digital rights server prior to first playback.

10. The system of claim 9 wherein the media content is purchased on a disc and loaded for playback and execution of the digital rights application by the first machine.

11. The system of claim 8 wherein the first machine is programmed to download the purchased media content from a website prior to first playback, wherein the website permanently transfers the key to the digital rights server prior to download to the first machine, the permanent transfer being characterized by an inability of the first machine to subsequently transmit the key to the digital rights server.

12. The system of claim 8 wherein the digital rights server creates a cross-reference entry in a lookup table used to cross-reference the keys with the purchased media content only after the media content is purchased.

13. A method for managing subscriber access to media content comprising:
- associating a unique key to each piece of media content, the unique key being required by a playback device in order to playback the associated piece of media content;
- embedding the unique key with the associated piece of media content, the embedded unique key traveling with the corresponding piece of media content;
- after purchase of a piece of the media content, receiving the unique key with a server, the server being in electronic communication with a first playback device initially used to playback the purchased piece of the media content, the first playback device being forced to permanently transmit the unique key to the server, the permanent transmission being characterized by an inability of the first playback device to subsequently transmit the unique key; and
- upon receipt of a request to playback the purchased piece of media content on a second playback device, transmitting the unique key from the server to the second playback device in order to permit playback of the purchased piece of media content at the second playback device.

14. The method of claim 13 further comprising the server transmitting instructions to the first playback device in order to force the first playback device to permanently transmit the unique key embedded on the purchased piece of the media content to the server.

15. The method of claim 14 further comprising the instructions requiring the first playback device to permanently transmit the unique key before a first playback of the purchase piece of the media content.

16. The method of claim 13 further comprising embedding the unique key on the purchased piece of the media content at a time of purchase.

17. The method of claim 16 further comprising embedding the unique key as a part of a download process used to download the purchased piece of the media content to the first playback device.

18. The method of claim 13 further comprising embedding the unique key on a disc used to store the purchased piece of the media content.

19. The method of claim 18 further comprising the server instructing the first playback device to remove the unique key from the disc after permanently transmitting the unique key to the server.

20. The method of claim 13 further comprising the server receiving the purchased piece of the media content from the first playback device and re-transmitting the received, purchased piece of the media content to the second playback device.

21. The method of claim 20 further comprising the server re-formatting the purchased piece of the media content prior to re-transmitting the purchased piece of the media content to the second playback device.

22. The method of claim 21 further comprising the server re-formatting the purchased piece of the media content from a first format required by the first playback device to a second format required by the second playback device, the second playback device being unable to playback the first format.

23. The method of claim 13 further comprising associating different, unique keys with each piece of the media content.

24. The method of claim 13 further comprising associating different, unique keys with each piece of the media content prior to purchase.

25. The method of claim 13 further comprising associating the unique key received by the server with a user.

26. The method of claim 25 further comprising limiting transmission of the unique key received by the server to the user associated therewith.

27. The method of claim 13 further comprising requiring the server to re-transmit the unique key each time the purchased piece of the media content is desired for playback.

28. The method of claim 13 further comprising limiting use of the unique key to only one of the first and second playback devices at the same time.

29. The method of claim 13 further comprising the server including digital right controls with the transmission of the unique key.

30. The method of claim 29 further comprising the digital rights controls limiting a total number of times the purchased piece of the media content can be played or a total number of copies that can be made of the purchased piece of the media content.

* * * * *